UNITED STATES PATENT OFFICE.

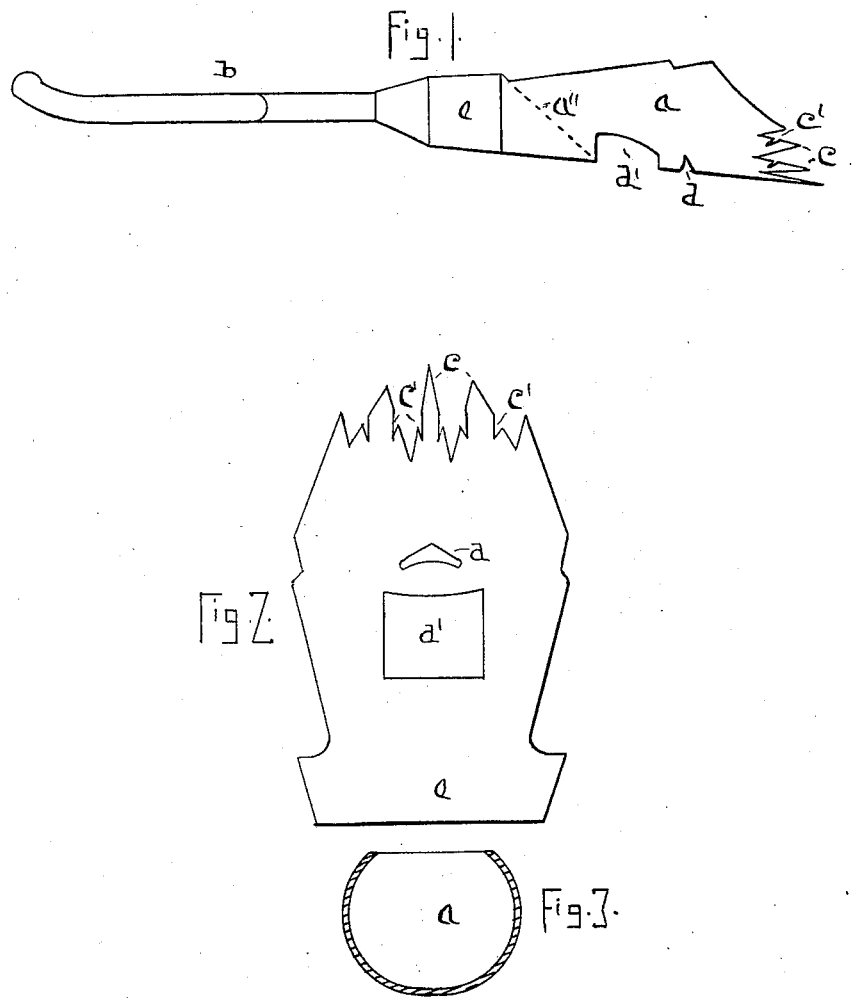

HENRI JEAN BAPTISTE GRAVIER, OF ITHACA, NEW YORK.

GREEN-CORN CUTTER.

SPECIFICATION forming part of Letters Patent No. 607,363, dated July 12, 1898.

Application filed September 27, 1897. Serial No. 653,143. (No model.)

*To all whom it may concern:*

Be it known that I, HENRI JEAN BAPTISTE GRAVIER, a citizen of France, late a resident of the city of Paris, France, but now a resident of Ithaca, Tompkins county, State of New York, have invented certain new and useful Improvements in Green-Corn Cutters, of which the following is a specification.

My invention relates to green-corn cutters designed for detaching the kernels of boiled green corn from the cobs; and it consists in the construction and novel combination of the parts of the same hereinafter described and claimed.

My object is to make a convenient effective instrument especially to be used for boiled "green" or table corn at the table where the corn is eaten, which, resembling somewhat the bowl of a spoon, readily disengages the kernels of corn from their cobs.

The structure of my implement and the nature of my invention will be apparent as I describe and claim it.

Figure 1 is a side elevation of my device. Fig. 2 is a view of the sheet of metal of which its anterior end is composed as cut out ready to be shaped into its bowl. Fig. 3 is a transverse sectional elevation of the bowl, the section being just in rear of the detaching-teeth of the bowl.

In the figures, $a$ is the bowl or front part of my implement, and $b$ its handle; and $c$ indicates the series of detaching-teeth, that are made with sharp cutting edges and with the serrations $c'$ in their sides, which serrations may be quite numerous. They greatly aid the cutting loose of the kernels.

$d$ is the anterior or small aperture in the base of the bowl, that is useful in catching any portions of the "silk" of the cob, and $d'$ is a large aperture in the base of the bowl, through which a portion or the whole of the detached kernels fall.

The dotted line $a''$ indicates the rear end of the bowl, beyond which is the ferrule part $e$ of the bowl, by which it is attached to the handle $b$, this ferrule being firmly soldered or brazed where its edges meet.

The handle and bowl can be made of one piece of sheet metal; but a spoon-shaped handle is preferred.

The implement can be made of silver or steel sheet plated.

In the use of my implement the cob, with its kernels of corn, is firmly held and the teeth are pressed along the cob between it and the kernels, and thus the kernels are cut loose. Everything else is believed to be apparent.

What I claim is—

As an improved article of manufacture, the herein-described hand implement for detaching the kernels of green corn from the cob of the green ear of corn, consisting of the handle provided with the concave bowl attached thereto and provided with the forwardly-projecting cutting-teeth having serrations in their edges, the large aperture in the base of the concave bowl, the anterior smaller aperture in the base of the bowl in front of the larger aperture, the rear wall of the bowl being inclined and terminating at its lower edge immediately in rear of the larger aperture of the implement, substantially as specified.

HENRI JEAN BAPTISTE GRAVIER.

Witnesses:
SAMUEL J. PARKER,
T. J. MCELHENY.